(No Model.)  5 Sheets—Sheet 1.

G. R. BURT.
CASH INDICATOR AND RECORDER.

No. 485,086. Patented Oct. 25, 1892.

WITNESSES:
Fred G. Dieterich
M. D. Blondel

INVENTOR:
George R. Burt.
BY Munn & Co
ATTORNEYS (No Model.) 5 Sheets—Sheet 3.

G. R. BURT.
CASH INDICATOR AND RECORDER.

No. 485,086. Patented Oct. 25, 1892.

WITNESSES:
Fred G. Dieterich
M. D. Blondel

INVENTOR:
George R. Burt.
BY Munn & Co.
ATTORNEYS (No Model.) 5 Sheets—Sheet 4.
G. R. BURT.
CASH INDICATOR AND RECORDER.
No. 485,086. Patented Oct. 25, 1892.
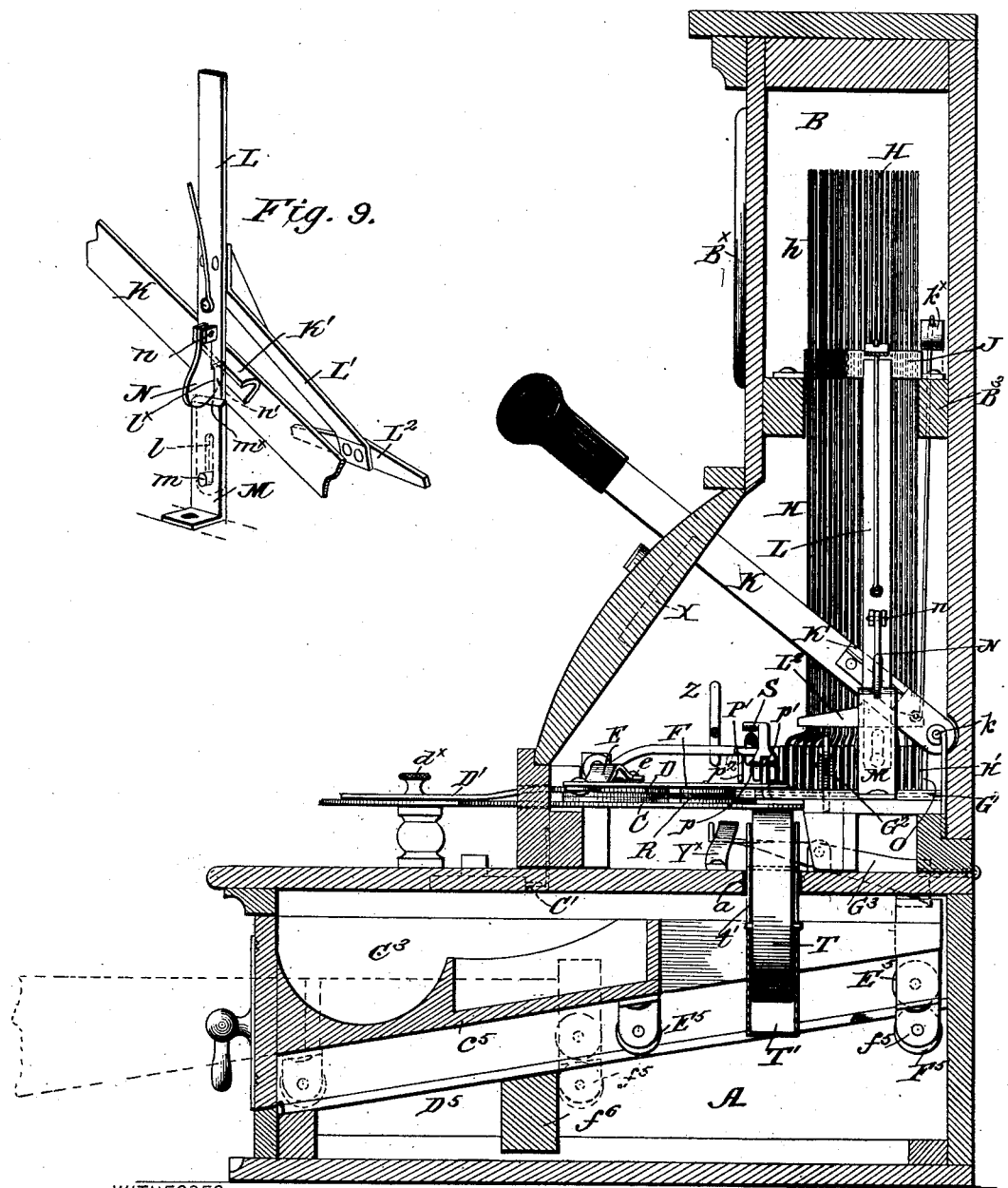

(No Model.) 5 Sheets—Sheet 5.

G. R. BURT.
CASH INDICATOR AND RECORDER.

No. 485,086. Patented Oct. 25, 1892.

WITNESSES:
Fred G. Dieterich
M. D. Blondel

INVENTOR:
George R. Burt.
BY Munn & Co
ATTORNEYS

THE NORRIS PETERS CO., PHOTO-LITHO., WASHINGTON, D. C.

UNITED STATES PATENT OFFICE.

GEORGE R. BURT, OF DALTON, NEW YORK.

CASH INDICATOR AND RECORDER.

SPECIFICATION forming part of Letters Patent No. 485,086, dated October 25, 1892.

Application filed March 4, 1892. Serial No. 423,772. (No model.)

*To all whom it may concern:*

Be it known that I, GEORGE R. BURT, residing at Dalton, in the county of Livingston and State of New York, have invented certain new and useful Improvements in Cash Indicators and Recorders, of which the following is a specification.

My invention relates to that class of cash indicators and recorders in which an adjusting-key mechanism and a single operating-lever are employed; and it has for its object to provide a machine of this character in which the sales-amount are printed upon a traveling apron or ribbon in a continuous column.

It has also for its object to provide a simple, inexpensive, and effective indicator-operating mechanism in which a single movable throw-arm is adapted for adjustment to operate the desired one of the indicator-plates.

It has for its object, furthermore, to provide a machine of this kind in which the different amounts are indicated at a single sight-opening, in which a simple springless-drawer-operating mechanism is provided, and in which the tripping-indicator and recording, alarm, and drawer mechanisms are all operated by the downward movement of the operating-lever.

With other minor objects in view, all of which will hereinafter be set forth, my invention consists in the peculiar combination and novel arrangement of parts, all of which will hereinafter be fully described in the annexed specification and particularly pointed out in the claims, reference being had to the accompanying drawings, in which—

Figure 1:
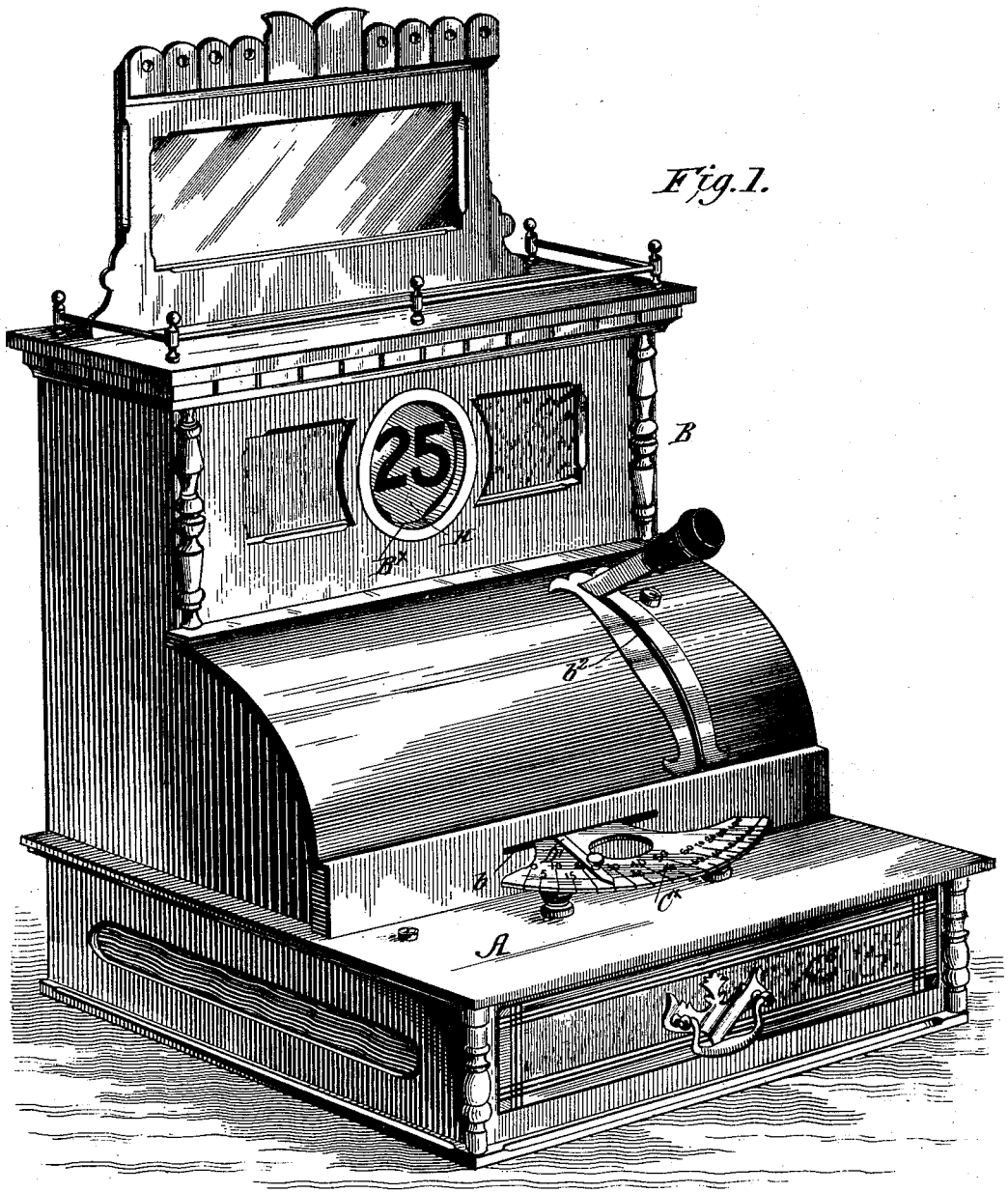
Figure 2:
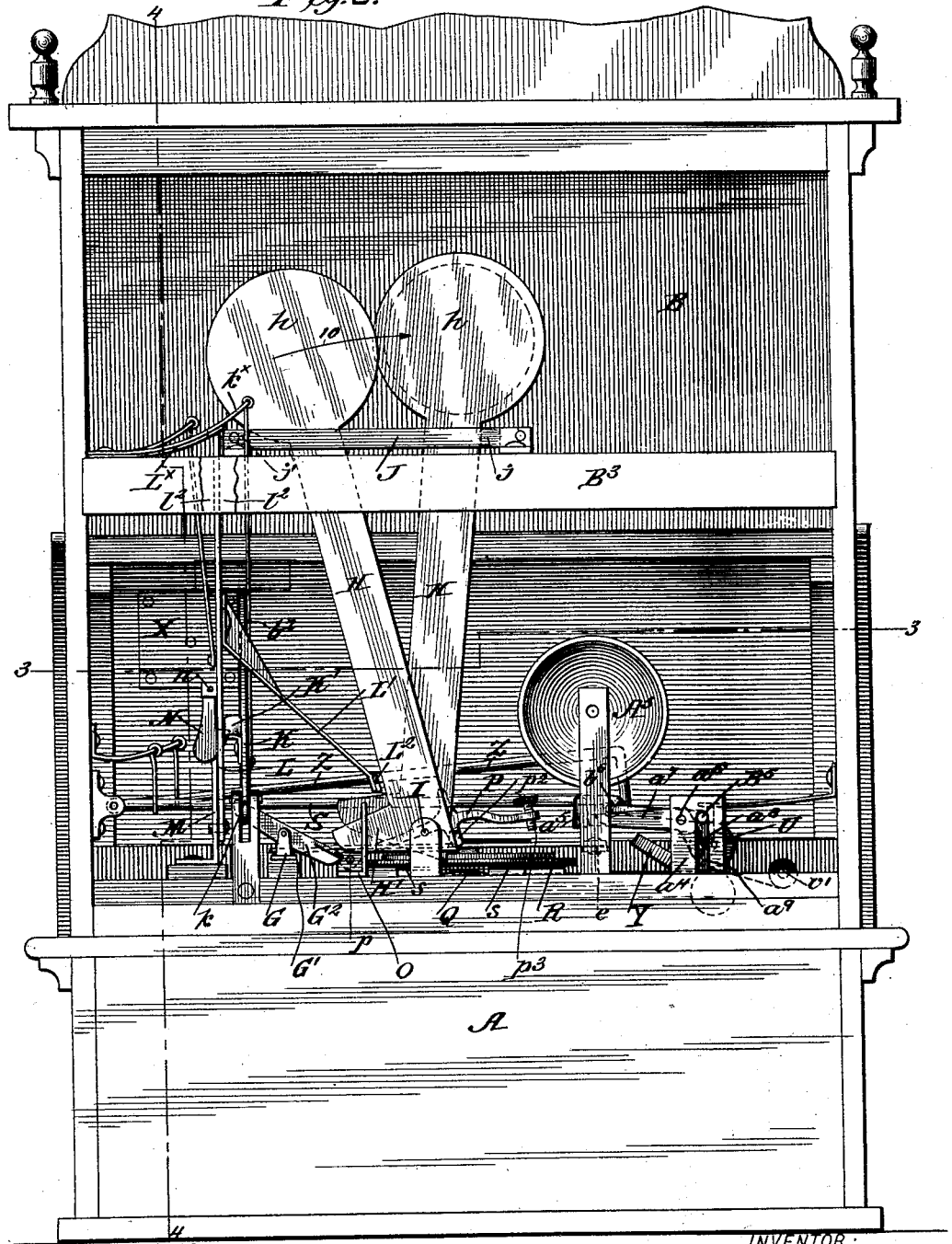
Figure 3:
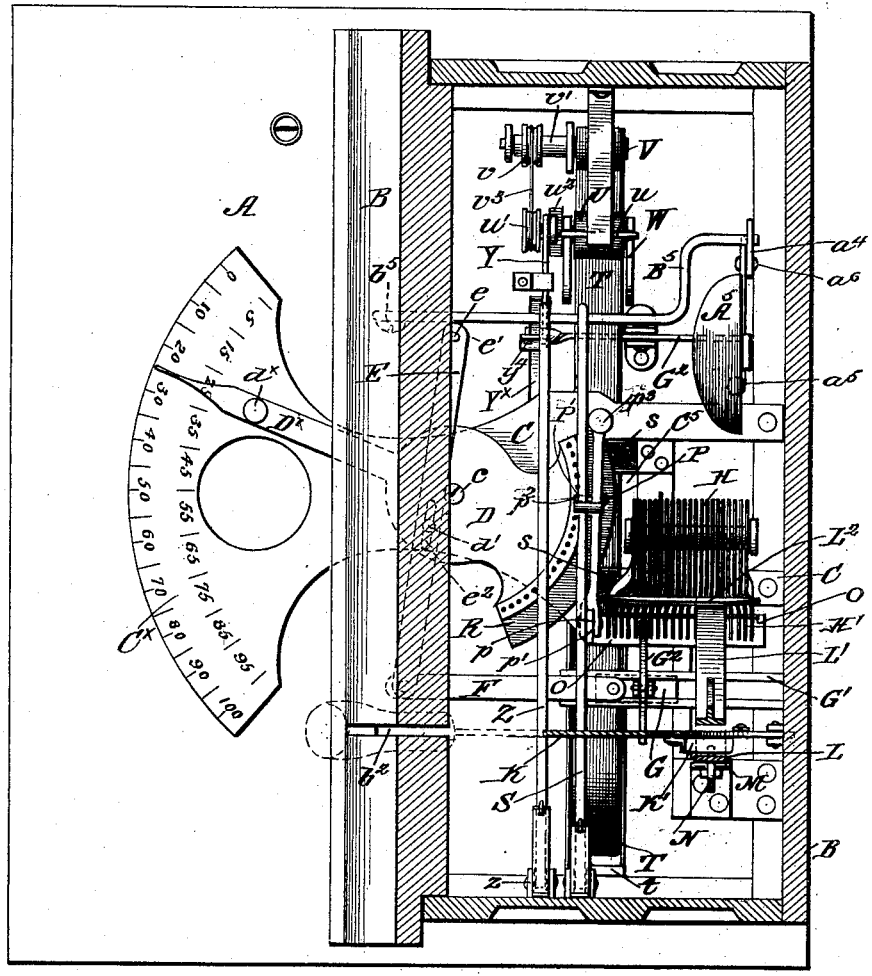
Figure 8:
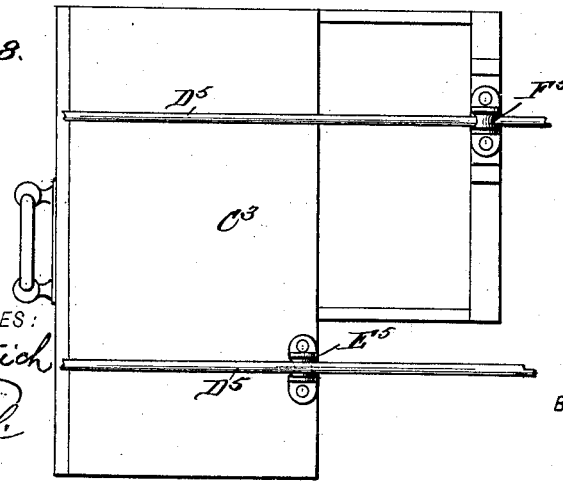
Figure 5:
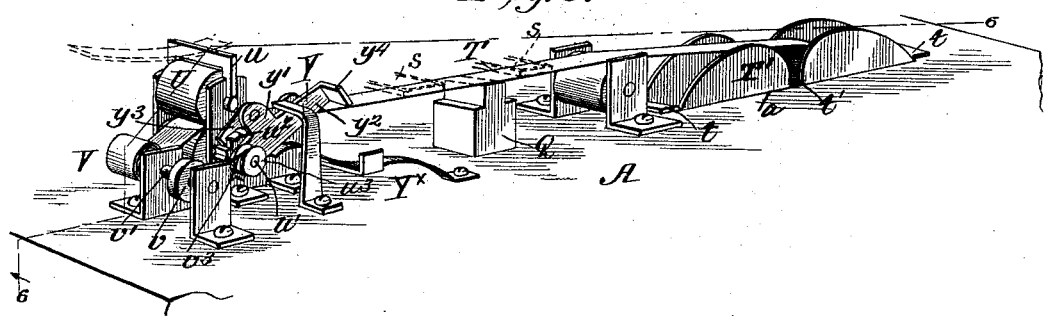
Figure 6:
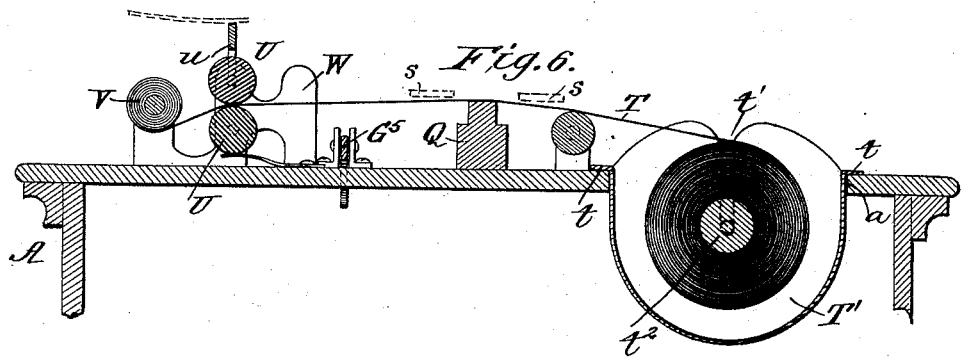
Figure 7:
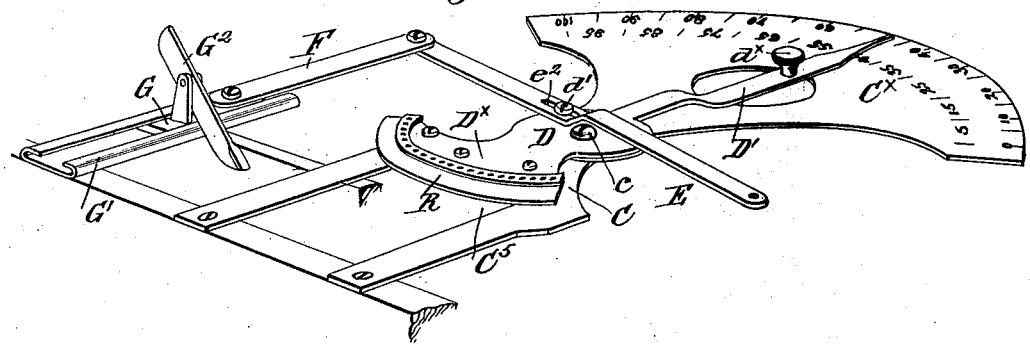
Figure 10:
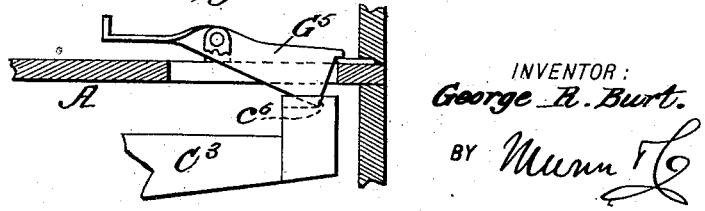

Figure 1 is a perspective view of my improved cash indicator and recorder. Fig. 2 is a rear view of the same with the back removed. Fig. 3 is a top plan view, partly in section, on the line 3 3, Fig. 2. Fig. 4 is a transverse vertical section of the same on the line 4 4, Fig. 2. Fig. 5 is a detail perspective view of the recording-ribbon-operating device. Fig. 6 is a longitudinal section of the same on the lines 6 6, Fig. 5. Fig. 7 is a detail perspective view of the adjusting key or disk, the indicator-operating arm, and the type-carrier. Fig. 8 is a detail view illustrating the drawer mechanism, and Fig. 9 is a detail view of the gravity-tripper pawl hereinafter referred to. Fig. 10 is a detail view of the drawer-lock.

The casing of my improved machine is of substantially the shape shown in Fig. 1, in the lower or base section A of which are the drawer and recording mechanism, while in the upper or hinged section B are held the indicating, alarm, and the recording operating devices, and the mechanisms in the lower and upper case sections are arranged in such a manner as to admit of the upper section being swung back to admit of access to the interior of the machine, whereby the proprietor can at any time ascertain the record of the sales or remove so much of the record-slip as indicates the sales for a specified time, such sections being normally held locked together by a locking device of any suitable construction, preferably such as shown at C' in the drawings.

For the sake of clearness I will first describe the construction and general operation of the indicator mechanism and then the recording mechanism and drawer devices.

Referring now more particularly to Figs. 3 and 4 of the drawings, it will be noticed that in the base of the upper section B is fixed a rigid plate C, the front end of which is projected through the front of the casing and is formed into a sector dial-plate $C^\times$, upon which are delineated the amounts which the machine is adapted to record and indicate, such amounts, as in the present instance, representing five cents and multiples thereof up to one dollar, it being understood, however, that the machine may be constructed to indicate penny or dollar sales.

Journaled upon a stud-pin $c$, secured to the plate C, is a disk D, which is formed with an outwardly-extending handle member or key-lever $D^\times$, which extends through an elongated slot $b$ in the casing and is arranged to traverse the upper face of the dial $C^\times$, it being formed with a finger or knob $d^\times$, whereby it can be conveniently operated.

Fulcrumed at $e$ on the bracket-piece $e'$ is a lever-arm E, which extends transversely over the disk D, has a movable connection therewith, it being provided with an elongated slot $e^2$, into which projects a stud-pin $d'$, projected up from the disk D at a point near its peripheral edge, as shown. The free end of the lever E is pivotally connected with a shifting-lever F, projected rearward, and being pivotally connected with a slide-bearing G, held to travel in a guideway G', and in the bearing G is pivoted a rocking arm $G^2$, one end of which is arranged to be brought in contact with any desired one of the indicators H, while its opposite end is arranged to be engaged by the operating-lever K.

The indicators H, the construction and arrangement of which is most clearly shown in Fig. 2, consist of a vertical plate, formed at their upper ends with enlargements $h$, (guided in ways J,) upon the front faces of which are printed or otherwise delineated the respective amounts from five cents to one dollar. All of the plates H are journaled at their lower ends upon a single shaft I, and such ends have lateral crank members H', under which the rocker-arm $G^2$ is arranged to travel, as shown.

It will be noticed that the series of indicator-plates are disposed in a line extending from the front to the rear, the front plate indicating "0," while the last or rear one indicates the largest amount "$1.00," and the intermediate ones the intermediate amounts, as will be readily understood, and any one of such plates is adapted to be swung in the direction indicated by the arrow 10 (in the manner presently described) in line with the sight-aperture $B^\times$ in the upper front part of the casing-section B. (See Fig. 1.)

It will be seen that the shaft I is located at a point to one side of the center of the sight-aperture $B^\times$ and the guides J extended in the same direction beyond the shaft I. This arrangement provides for a simple and effective means for holding the indicators back to their normal position without the aid of springs and after they have been drawn away from the sight-opening $B^\times$ by the tripping mechanism presently described. This is explained as follows: When any one of the plates H is swung toward the sight-aperture by the rocker-arm $G^2$, so soon as it passes the vertical plane of its axis will by its own gravity fall toward its seat or rest $j$, and when it is swung back by the tripper mechanism the same results will follow, except that it will return to its seat or rest $j'$.

The operating-lever K is fulcrumed at $k$ upon the rear wall of the casing-section B, and such lever extends diagonally upward. Its front end passes through an elongated slot $b^2$ in the curved face of the front of the section B and has a suitable handle, as shown. This lever, which is normally held to its upper position by a spring $k^\times$, has a lateral lug K', which is arranged to engage the tripper mechanism on the first portion of its downward movement and be then disengaged therefrom to engage the indicator rocker-arm $G^2$, and such mechanism, which is most clearly shown in Figs. 2 and 9, consists of a vertically-movable arm L, guided at its lower end on a stud-pin $m$, projected from the face of a short standard M, such pin passing through an elongated slot $l$ in the arm L, the upper end of which arm is guided in ways $l^2\ l^2$ on the cross-bar $B^3$.

It will be noticed in Fig. 2 that the arm L has a diagonally-extending member L', having a transversely-extending foot portion $L^2$, which projects normally over the crank ends H' of the indicator-plates, such foot portion and the levers L L' being held to their upper or normal positions by a spring $L^\times$, as shown.

N indicates a gravity-pawl, which is hung on a pivot $n$ on the rear face of the arm L, the lower weighted end of which has a forwardly-projecting lip $n'$, which projects through a slot $l^\times$ and is arranged to normally extend under the lug $k'$ on the lever K. It will be noticed in Fig. 9 that the lower weighted end of the pawl N seats on the upper end of the standard M, which end is beveled at $m^\times$, the purpose of which will presently appear.

Before describing the operation of the indicator-operating mechanism it should be stated that the relative arrangement of the segment $C^\times$, the lever-arms D E F, and the slide-bearing G is proportioned to the movement of the pointer D'—i. e., should the pointer be over the point indicated by "0" on the dial the slide-bearing G would be at its farthest point forward, bringing, as it were, its rocker-arm $G^2$ in position to engage the crank-arm H' of the front indicator-plate, which represents "0;" but when the pointer D' is swung over to the "100" mark it will have moved (through the levers E and F) the slide-bearing G to its rearward position, which at this time would bring the rocker-arm under the last or "$1.00" indicator-plate, the intermediate movement of the finger D' serving to bring the rocker-arm $G^2$ under the respective intermediate crank portions of the plates H, such crank portions being held to operate in a suitably arranged guide-plate O, as shown. Now assuming that the last sale made was twenty-five cents, the respective indicator-plate H would be in position to register with the sight-opening $B^\times$ and its crank portion H' will be up in engagement with the foot portion of the tripper. Now assuming the next sale to be ten cents the operator in moving the finger D' back to over "10" on the dial will thereby adjust the slide-bearing G until the arm $G^2$ is under the respective indicator-plate H. The operator then grasping the lever K and moving it downward causes the lug K' to engage the gravity-pawl N and draws it down, pulling with it the arm L, and thereby causing its tripper member and shoe to be depressed and the shoe engaging the elevated plate showing "25" cents will rock it back away from the sight-aperture, its back movement being facilitated by the peculiar manner in which it is journaled, as before stated. Now as the pawl N is drawn down it engages the beveled end $m^\times$ of the standard and is swung rearward thereby and disengaged from the lug K', which permits the arm L and its tripping members to be quickly drawn up by the spring to their upper position. Now as the lever K continues on its downward movement it will engage the upper rear end of the rocker-arm G², depress such end, and throw its forward end upward, which, engaging the proper indicator-plate, throws it over toward the sight-opening, it dropping into its seat $j$ in the manner previously explained. It will thus be seen that by constructing the indicator mechanism as stated many advantages are presented, in that but a single operating mechanism, which in itself is of a very simple nature, is provided for operating the entire series of indicator-plates, and thereby reducing the chances of the parts becoming broken or inoperative to a minimum.

Referring more particularly to Figs. 2, 5, and 6, in which the registering devices are most clearly shown, P indicates the plunger or printing-lever, which is fulcrumed at $p$ to a bracket $p'$, and has an impression-lever $p^2$, which is adapted to be brought down against a flexible type-section R and press same against a bed-piece Q, located to the rear of the central axis of the disk or lever D. This lever P has its front end extended, as at P', which is provided with an adjustable stop $p^3$, which when the lever is forced down limits the stroke thereof and prevents a too-great pressure on the type-section R. The type-section R is formed of a segmental rubber plate, upon the under face of which is formed a series of numbers corresponding to the numbers on the dial $C^x$, and such plate is secured to a rearwardly-extending portion $D^x$, formed integral with the disk and pointer-plate D D'. This extension $D^x$ has an annular series of apertures arranged radially with the type members, which apertures are arranged to receive a lock pin $p^3$, formed in the impression-lever P, when such lever is depressed, whereby the type-section and the disk D are held from movement during the operation of printing.

It will be clearly understood by reference to Fig. 2 that a movement of one space of the pointer member D' on the dial will serve to move the type-section one space. Thus should the finger D' be on "5" the type-number "5" on the type-plate R will be just over the impression-block Q. Now when the lever K is pulled down it will engage a pivoted lever S, which has a connection with the lever P at $p^4$, and in forcing such lever S down it will depress the lever P and cause it to lock the disk-plate D and type-section in place and at the same time make an impression on the recording-ribbon T, which is disposed between the type and the impression-block Q. As it is necessary that the ribbon at each operation of the machine be moved so as to receive the subsequent charges in succession, I provide the automatically-operated devices most clearly shown in Figs. 5 and 6, and which consist of the ribbon-spool carrier, formed of a pocket or casing T', which is held in a socket $a$, formed in the base A of the casing, it being detachably held therein by the end flanges $t\ t$, which fit over the end edges of the sockets, and such casing has vertical slots $t'$ in its sides, in which the journals of the spool $t^2$ seat and rotate. By arranging the spool-holder as described the same can be readily detached, the empty spool removed, and a full spool inserted.

$s\ s$ are ink-pads, which are projected up through the openings $C^5$ in the base-plate, and are arranged to each side of the impression-block Q, as shown in Fig. 2 and in dotted lines in Fig. 6. The free end of the ribbon T passes from the spool under these ink-pads and over the impression-block Q between the feed-rollers U U, and then onto the receiving or winding roller V, as clearly shown. These rollers U and V are journaled in a frame W, mounted in the lower case-section A, and the upper one of the rollers U has a yielding bearing $u$, as shown. The shaft $u'$ of the lower roller U is extended and carries a ratchet-wheel $u^2$ and a small belt-pulley $u^3$, such pulley being belted with a similar pulley $v$ on the roller-shaft $v'$ by the crossed belt $v^3$.

Y indicates a spring-actuated bell-crank lever pivoted on the frame W, the short arm $y'$ of which carries a pawl $y^3$, which engages the ratchet $u^2$, while its long arm $y^2$ is extended up and formed with a contact member $y^4$, adapted to be engaged by a spring-actuated lever Z, hinged at $z$ to the casing-section B, its rear end being disposed in the path of the operating-lever K, by which it is operated.

In operation when the lever K is brought down it will engage the lever Z, force its front end down, which end engages the lever Y, depresses it, and draws the pawl $y'$ up over the ratchet. Now as the lever K has depressed the lever Z and the printing-lever mechanism, and it is drawn back and the lever Z raised from contact with the lever Y, the spring $Y^x$ will draw the bell-crank Y back, and the pawl $y'$ being at this time locked with the ratchet-wheel will cause the ratchet and its shaft to rotate to feed the paper forward. A reverse motion being imparted to the roller V, the paper will be wound thereon.

$A^5$ indicates the bell, and $a^5$ the hammer, which is pivoted to a standard $a^4$ at $a^6$, and such hammer has its arm $a^7$ formed with a cam portion $a^8$, which projects over a slot $a^9$ in the standard, in which slot operates a lever-arm $B^5$, fulcrumed at $b^5$ and connected with the lever $s$, as at $b^6$, such construction providing a simple and effective means whereby the gong is sounded at each operation of the machine.

A simple and effective means whereby the drawer automatically opens when the lever K is operated is shown in Figs. 3 and 10, by reference to which it will be seen that the usual spring or springs for shoving the drawer outward are dispensed with and the drawer supported on inclined ways.

As shown, the drawer C⁵ has an inclined bottom $c^5$, the deeper portion being at the front end, which end has the usual coin-compartments, while the shallow rear portion is spaced off into note-compartments, as shown.

D⁵ D⁵ indicate the inclined ways or rails, which incline from the rear toward the front, upon which the drawer runs, it being provided with grooved rollers E⁵ E⁵, which travel on the tracks D⁵ D⁵. (See Fig. 3.) To hold the drawer to the rails and prevent its becoming detached therefrom, one of the bearings for the rollers E⁵ is extended, as at $f^5$, below the rails D⁵, in which is journaled a grooved roller F⁵, which engages the lower face of the rail D⁵, as shown.

G⁵ indicates a gravity-lever, the rear end of which forms the locking-latch, which engages the lock-notch $c^6$ of the drawer when the drawer is closed in. Such latch has its front end disposed under the long end of the bell-crank lever Y, and is adapted to be depressed thereby when such lever Y is depressed by the lever Z.

By constructing the drawer and arranging it on inclined guideways, as stated, it will be readily seen that when it is released it will fall out by gravity until its under roller F⁵ engages the stop $f^6$, which limits the movement thereof.

From the foregoing description, taken in connection with the drawings, the complete operation and the advantages of my improved machine will be readily understood. The operator after making the sale moves the pointer-finger D' over the proper number and then depresses the lever K, and as such lever is brought down it will operate to trip the last indicator-plate back to its normal position, operate the rocker-arm G², and swing the proper plate in sight, lock the type-bar and disk D Dˣ to its adjusted position, cause an impression of the amount of sale to be made upon the tape, set the tape-feeding mechanism for operation, release the drawer, and ring the gong. When it is desired to ascertain the amount of sales, the proprietor unlocks the top, tilts it back, tears off so much of the tape as has been printed upon, and adds up the amounts indicated thereon. Should the attendant at any time wish to leave the machine and prevent it being operated by the proprietor or other person he can lock the lever K in its upper position by means of a locking device such as shown at X. When it is desired to make change or gain access to the drawer without recording, the pointer is placed over "0," which adjusts the type-section with its "0" type over the impression-block, and when the lever K is worked the parts will act as before, "0" being, however, recorded on the tape and indicated at the sight-aperture Bˣ.

Having thus described my invention, what I claim, and desire to secure by Letters Patent, is—

1. A cash indicator and recorder comprising a casing having a sight-opening, a dial-section, an adjusting key or lever movable on the dial, a series of independently-movable indicators, an indicator-operating device for engaging any one of the indicators, intermediate mechanism connecting the said device with the dial-key, such mechanism arranged to move the indicator-operating device proportionately to its adjustment on the dial, whereby it is set to operate the desired indicator, and a lever for operating such device, substantially as and for the purposes described.

2. In a cash indicator and recorder, an indicator-operating mechanism comprising a fixed dial held on the outside of the casing, a lever or pointer-arm movable thereon, a series of indicator-plates having the same axial bearing, a single operating-lever having a movable bearing, whereby it can be set for engagement with any one of the indicator-plates, lever connections between such bearing and the dial-lever, whereby the bearing is shifted proportionate to the movement of the dial-lever, and means for operating the indicator-operating lever, substantially as and for the purposes described.

3. In a cash indicator and recorder, the combination of a fixed dial-plate, a pointer or dial-lever movable thereon, a series of independently-movable swinging indicator-plates, a rocker-arm for engaging any one of such plates, movable longitudinally parallel with the axis of such plates, lever connections between such bearing and the dial-lever, whereby a longitudinal movement is imparted to the bearing as the dial-lever is adjusted over the dial, and means for operating the rocker-arm from the outside of the casing, substantially as and for the purposes described.

4. In a cash indicator and recorder, the combination, with the casing having a single sight-opening, a series of indicator-plates having the same axial bearing, but independently movable, such plates having lateral crank portions, lever mechanism for operating the plates to swing them over the sight-opening, the dial, the dial-lever, and the intermediate connections, whereby such mechanism is set by the movement of the dial-lever, of the main operating-lever hinged at its rear end within the casing, its front end projected beyond the front thereof, the tripping-lever held normally from contact with the indicator-plates, and devices adapted to interlock the tripping mechanism and the main lever, whereby the tripping mechanism is operated at the beginning of the movement of such main lever, and means for automatically disconnecting such devices from the main lever, substantially in the manner and for the purpose described.

5. In a cash indicator and recorder, the combination, with the dial, the dial-lever or pointer, the movable rocker-arm G², the connecting-levers E and F, and the sight-opening B×, of the transverse shaft I, disposed to one side of the center of the opening B×, the plates H, pivoted therein, their upper ends adapted to be swung over the opening B× and formed with lateral extensions H' at their lower ends, the lever K, and the tripping mechanism, all arranged substantially as and for the purposes shown and described.

6. The combination of the lever K, having a catch-lug K', the swinging plates having extensions H', the rocker-arm G², the tripper-levers L L' L², the standard M, and the gravity-pawl N, pivoted on the lower member L, its lower end held in engagement with the standard M, its upper end formed with a lip which engages the lug K', all arranged substantially as and for the purposes described.

7. In a cash indicator and recorder, in combination, the casing, a dial-plate projected from the outer face thereof, a dial-lever or pointer journaled to traverse the dial and formed with a rearwardly-projecting portion having a flexible segmental type-section at its inner end, an impression-block, a recording-ribbon interposed between the block and the type-section, an operating-lever projected to the outside of the casing, and an impression-lever mounted inside of such casing, having an impression member and adapted to be engaged by the operating-lever, whereby to engage the type-section, all substantially as and for the purpose described.

8. In a cash indicator and recorder, substantially as described, the combination, with the main lever K, of the dial-plate C×, the pivoted lever or disk D, having a forwardly-extending pointer member D' and a segmental type-section at its rear end, the ribbon T, the feed devices for moving the ribbon, the printing-lever having an impression member, and an adjustable stop to limit its downward movement, all arranged substantially as and for the purpose described.

9. In a cash indicator and recorder, substantially as described, the combination, with the main operating-lever K, the indicator-plates, the printing-lever, the recording-ribbon, and the dial, of a lever plate or disk D, journaled on the dial-plate, its front end formed into a pointer or adjusting-lever, its rear end carrying a segmental flexible type-section, the indicator-operating mechanism, the connections between such mechanism and the disk D, all arranged substantially as shown, whereby the indicator mechanism and the type-section are moved into their proper operative positions by the adjustment of the dial-lever on the dial, substantially as shown and described.

10. In a cash indicator and recorder, substantially as described, the combination, with the casing, the fixed plate C, its forward end projected beyond the front of the casing and formed into a dial member, the plate or disk D, journaled in such plate C, formed with a rear segmental member D³, having an annular series of apertures $d^4$, the segmental flexible type-section R, carried by such member D³, the impression-block, the ribbon, and the ribbon-feed devices, of the lever P, having an impression member P', a lock-pin $p^3$, adapted to engage the apertures $d^4$ when the lever is depressed, and the main lever K, all arranged as shown, and for the purposes described.

11. In a cash indicator and register of the kind described, the combination, with the base-section A, having a recess a, of the ribbon-spool carrier formed of a pocket or casing T', adapted to fit in said recess and having ears or extensions t t, adapted to lap the end edges of such recess, and formed with side notches t', forming the bearings for the spool-axles, substantially as shown, and for the purposes described.

12. In a cash indicator and register, substantially as described, comprising a casing having a single sight-aperture, a horizontal dial member projected to the front of the casing, a printing mechanism, a recording-ribbon, the ribbon-feed devices, a series of swinging indicators, a differentially-movable indicator-operating rocker-lever, a single adjusting key or lever journaled in the dial-plate, connected with the rocker-lever and the printing mechanism, said adjusting-lever adapted when moved over the dial to set the rocker-lever and the printing mechanism to their proper operative position, and a single operating-lever having its handle extended without the casing and adapted when depressed to operate the indicator rocker-arm, the printing mechanism, and the feed devices, all arranged in the manner substantially as herein shown and described.

13. In a cash recorder and indicator, the combination, with the main casing having a drawer-compartment formed with inclined guide-rails D⁵ D⁵, a stop member $f^6$, and an automatically-operating locking-trigger, of a drawer having a guide-roll E⁵, engaging the upper face of one of such rails D⁵, and guide-rolls E⁵ and $f^5$, arranged to embrace the opposite rail D⁵, said roll $f^5$ projected below such rail and operating to engage the stop $f^6$ when the drawer is released, whereby to limit the outward movement of such drawer, substantially as and for the purpose described.

GEORGE R. BURT.

Witnesses:
FRED G. DIETERICH,
SOLON C. KEMON.